March 10, 1931.    J. A. BEERWORTH    1,796,185
LUMBER SPLICING MACHINE
Filed Oct. 8, 1928    3 Sheets-Sheet 1
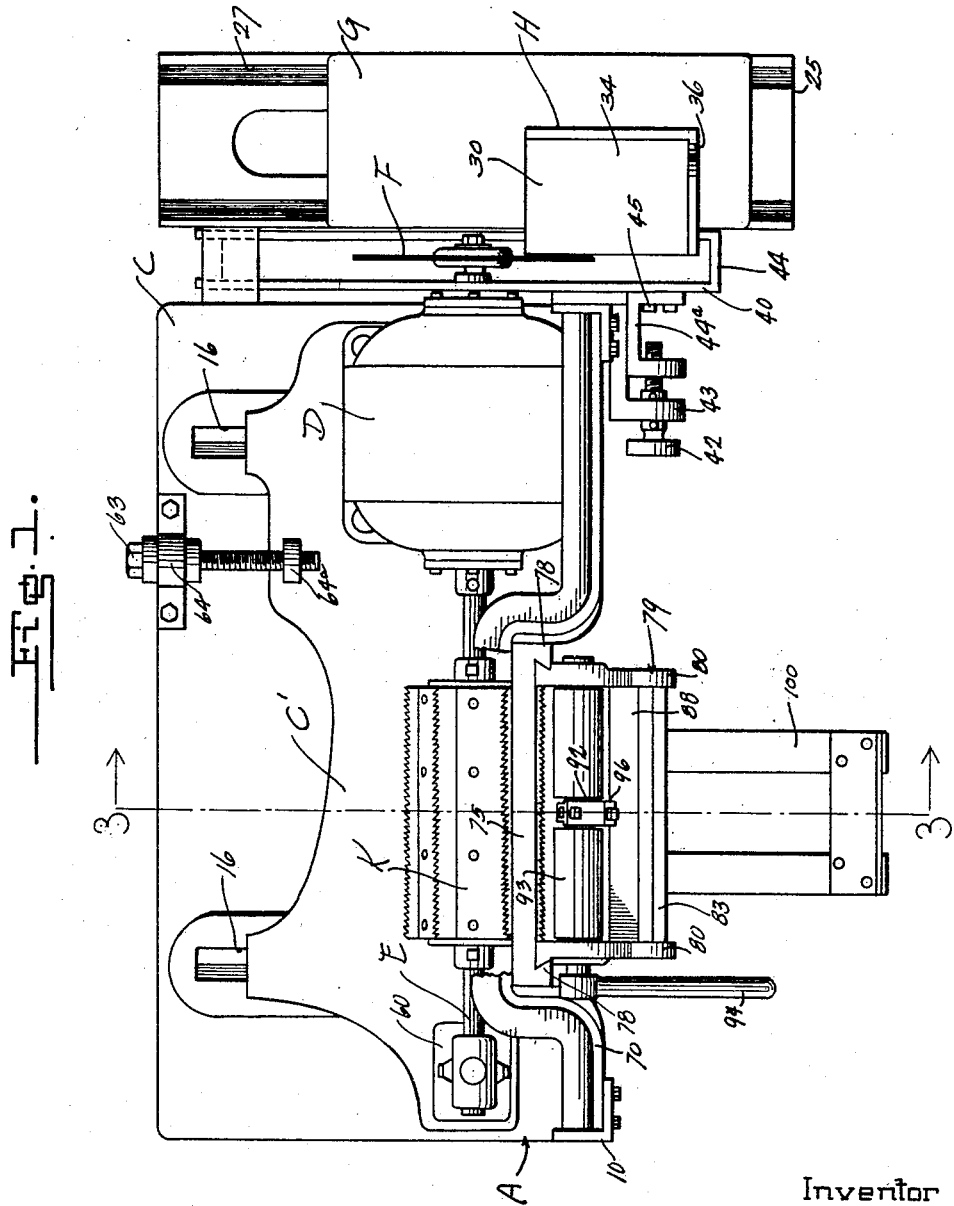
Inventor
Jesse A. Beerworth
By Lancaster and Allwine
Attorneys

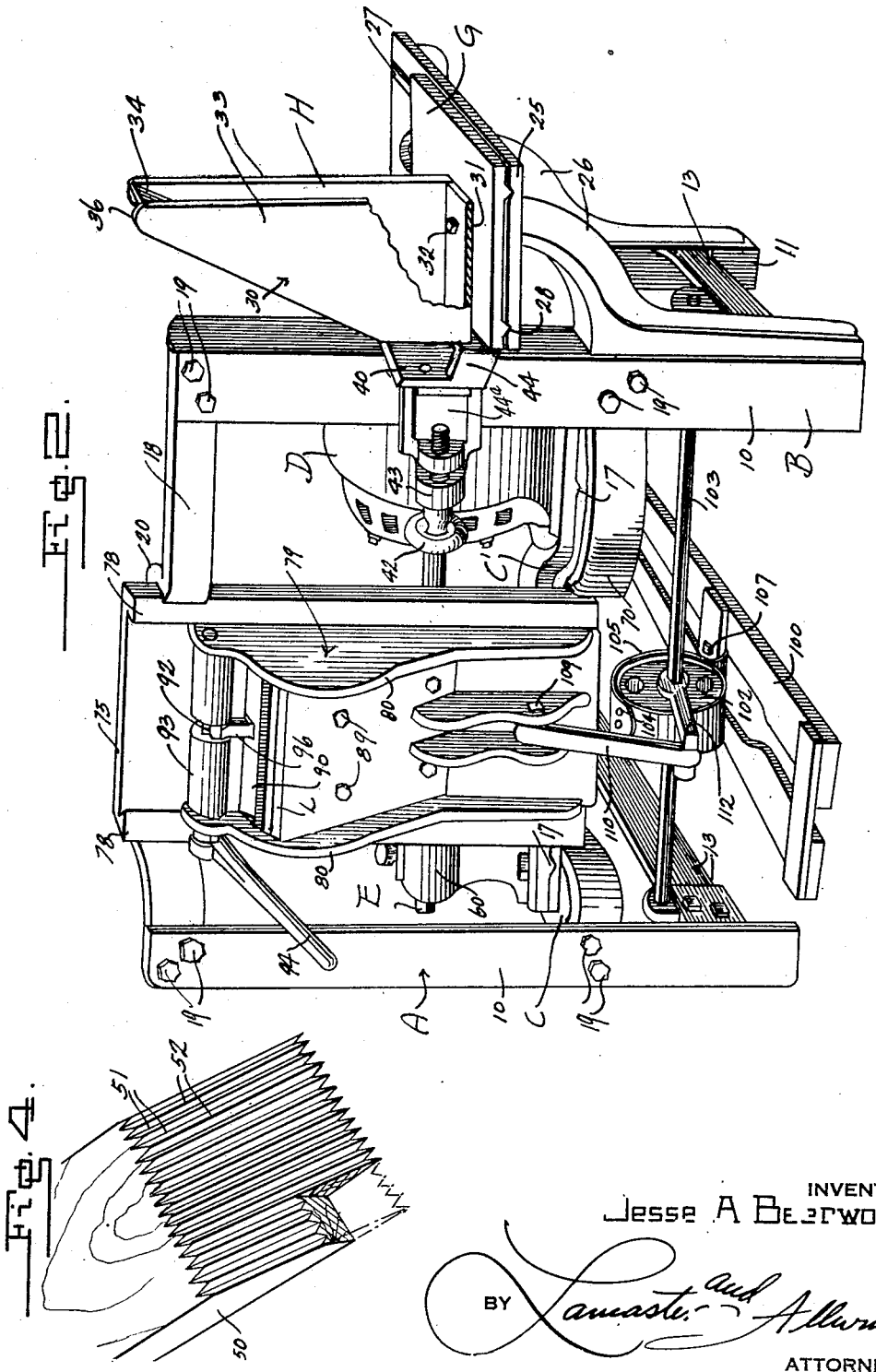

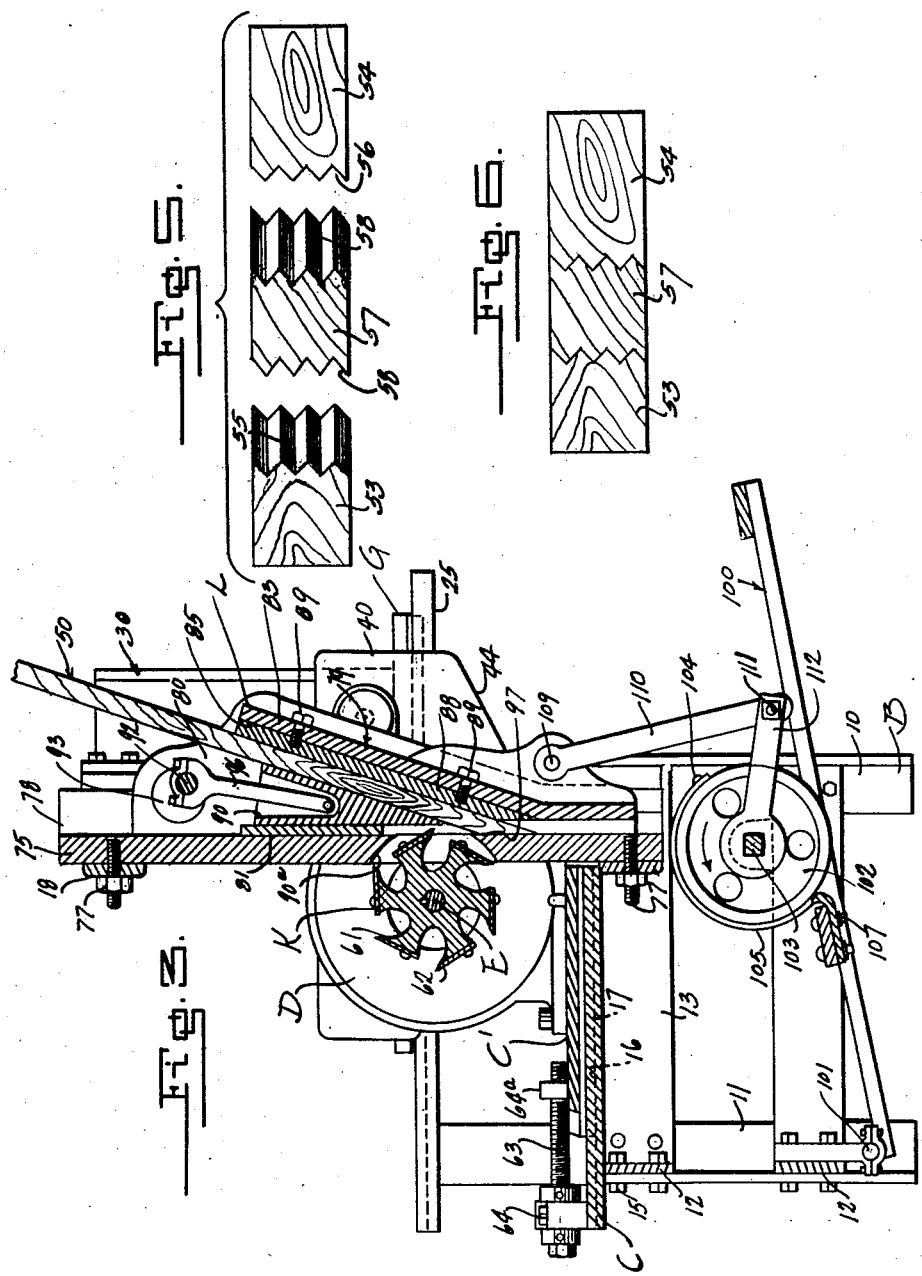

Patented Mar. 10, 1931

1,796,185

UNITED STATES PATENT OFFICE

JESSE A. BEERWORTH, OF ASHEVILLE, NORTH CAROLINA

LUMBER-SPLICING MACHINE

Application filed October 8, 1928. Serial No. 311,208.

This invention relates to improvements in machines for conditioning lumber.

It is the primary purpose of this invention to provide a machine which will efficiently surface the ends of a plurality of sections of lumber in order that they may be interfitted in a tight fitting, substantially sealed joint. The invention finds application in the wood working art, in order that lumber which is ordinarily wasted may be economically used. Thus, short lengths of lumber are ordinarily regarded as waste. With the improved machine, a splicing section may be incorporated in a short piece of lumber, or two or more short lengths of lumber may be properly spliced at the ends by the improved machine and subsequently connected, as by gluing, to provide a length of lumber of a proper stock size, in which the joint is substantially concealed, and as strong as the lumber at any cross section.

The improved machine is further used upon high grade lumber or boards, for the removing of a knotted section and conditioning the ends of the lumber sections out of which the splice is taken, so that they may be interfitted with a substantially concealed joint.

A further object of this invention is the provision of an improved method of splicing a plurality of sections of lumber with a neat and durable jointed connection.

Other objects and advantages of this invention will be apparent during the course of the following detailed description.

In the accompanying drawings, forming a part of this specification, and wherein similar reference characters designate corresponding parts throughout the several views, Figure 1 is a plan view of the improved splicing machine.

Figure 2 is a perspective view of the rear of the improved machine.

Figure 3 is a sectional view of the machine taken on the line 3—3 of Figure 1.

Figure 4 is a perspective view showing how an end of a section of lumber is prepared with the improved machine.

Figure 5 is a view showing a plurality of sections which are spliced together, with their ends appropriately conditioned by the improved splicing machine so that they may interfit properly.

Figure 6 is a plan view showing a piece of board or lumber formed of a plurality of splicing sections, the adjacent proximate ends of which have been conditioned by the improved splicing machine.

In the drawings, wherein for the purpose of illustration is shown only a preferred embodiment of the invention; the letter A may generally designate the improved splicing machine, which may consist of a frame B having a table or bed C thereon, upon which a slidable carriage C' is positioned. A motor D is carried by the carriage C', having a shaft E upon which a bevel cutting saw F is placed. A carriage G is provided for supporting a stand H upon which lumber is positioned for a bevel cutting operation by the saw F. A cutter head K is provided upon the shaft E, and apparatus L supports a board or lumber in proper cutting relation with the cutter head K to finish the end of the board or lumber so that a joint of a plurality of sections of the lumber may be provided according to this invention.

The frame B preferably consists of rear legs and uprights 10, and shorter front uprights 11, all of angle iron or other appropriate construction; the same preferably being connected by front horizontal braces 12 and side cross braces 13. The bed C is bolted as at 15 to the legs 10 and 11, and as shown in Figure 2 of the drawings the bed is preferably provided with substantially V-shaped grooves 16 thereacross, within which the V-shaped ribs 17 on the bottom of the carriage C' slide, to guide the movement of the carriage C' across the bed C.

The standards 10 at the upper ends thereof are preferably connected by a horizontal brace 18, bolted at 19, as shown in Figure 2; this brace 18 having a substantially U-shaped part 20, which is offset forwardly and adapted to support parts of the means L to be subsequently described.

On the slidable carriage C' is detachably mounted an electric motor D; the shaft E of which is disposed with its axis at right angles to the direction in which the bed C may be slid. At one end, preferably extending beyond the bed C, the shaft E has the circular saw F keyed therewith, positioned with respect to the device H to cut a bevel on boards placed thereagainst.

The frame B furthermore is provided with a saw carriage base 25 supported by brackets 26 at an elevation above the bed C, and beyond an end of the same; the brackets 26, as shown in Figure 2 of the drawings being secured upon the legs of the frame B. The carriage base 25 is provided with grooves 27 paralleling the grooves 16 above mentioned, and the carriage G, adapted to slide upon the base 25, has ribs 28 on the under surface thereof adapted to seat in the grooves 27 so that the carriage G may be moved parallel with the adjustment of the carriage C'. This movement of the carriage C', of course, takes place in a line parallel with the plane of the circular saw F.

The device H includes a board supporting stand 30, the same being preferably a casting, and including a bottom 31 bolted at 32 to the carriage G, as shown in Figure 2. It is provided with upstanding walls 33 and a slanting platform 34 disposed at an angle to the perpendicular, and upon the upper surface of which boards may be supported at an angle to the vertical, so that the lower ends thereof may be severed at an angle, or on a bevel, by the saw F, as the carriage G is moved along the frame B. To hold the boards plumb or in proper alignment upon the platform 34, one of the walls 33 of the support 30 is extended upwardly to provide a guide flange 36 extending in right angled relation from the plane of the platform 34, and at a side thereof, against which the sides of the board which is to be cut upon the bevel is abutted, for obvious purposes.

The apparatus H furthermore includes an adjustable stop 40, supported in any approved relation for movement by the bed C in a line parallel with the shaft E; the stop 40 preferably being plane in formation, and being disposed at the opposite side of the saw blade F with respect to the stand 30, and adapted to receive the lower edge of the board upon which the bevel is to be cut, thereagainst, to steady the same prior to and during the bevel cutting operation in a manner which will be apparent to those skilled in the art. This adjustable stop 40 is preferably adjusted towards and away from the saw blade F by means of an adjusting bolt or screw 42, rotatably supported upon a bracket arm 43 carried by the leg 10. A U-shaped bracket 44$^a$ is detachably connected at 45 to the adjustable stop 40, having a screw threaded opening which receives the screw 42 therein, so that upon rotation of the latter the stop plate 40 may be adjusted towards and away from the blade F to regulate the distance at which the board to be bevel cut is positioned with respect to the saw blade F, so that boards of different thicknesses may be properly bevel cut thru the entire thicknesses thereof.

A trough 44, shown in Figures 1 and 3 of the drawings is provided, which may be carried by the stop 40, or by the bed or frame of the machine, the same being either stationary or movably connected, and disposed below the saw blade F for receiving saw dust and cuttings; being disposed at an angle for carrying the waste material away from the location of work.

After the board or lumber has been bevel cut by the means above described, and the splice piece, or the section to which it is to be connected has been correspondingly cut, the sections of lumber are then supported and held by the means L while the cutter head K operates thereon to cut grooves and ribs, of preferably a V-shaped formation along the bevel cut surface. More particularly, observing Figures 3, 4, 5 and 6, it will be seen from the former that a piece of lumber 50 has been bevel cut at an end thereof, and the cutter K is then brought into play to cut parallel V-shaped grooves 51 along the bevel cut surface; this of course leaving V-shaped ribs 52 between said grooves having uniformly spaced centers. With such conditioning of the boards or lumber, short sections of lumber, which have ordinarily been considered waste material may be properly used, as shown in Figures 5 and 6, which show end sections 53 and 54, bevel cut at 55 and 56 from their upper and lower surfaces respectively. One or more intermediate or splice sections 57 may be similarly bevel cut at the opposite ends thereof, as shown at 58, for an interfitting tongue and groove connection with the bevel cut ends of the sections 53 and 54, so that the sections may be assembled as shown in Figure 6 to provide a continuous board or length of lumber which is sufficiently long that it either exactly corresponds to a desired useful length, or which may be cut at either of the ends thereof to the proper length. Of course, the bevel tongue and groove surfaces as thus cut, are glued together, and in such manner that the splice or connections are stronger than the fiber section of the lumber itself. This is all done at a very low cost, and in an entirely practical manner.

The motor shaft E at the opposite side from the saw blade F extends parallel above the sliding carriage C', and at its free end it is detachably supported by a detachable standard on bearing 60. Between this bearing and the motor D the shaft E is provided with the cutter head K, which may be of suitable formation for cutting grooves in a plane surface; the same being detachably keyed on the shaft E and having radial arms 61 upon which cutter blades 62 are mounted; said blades preferably being toothed at their cutting edges, as shown in Figure 1, for cutting grooves in the board 50, which is shown in position in the means L in Figure 3 of the drawings.

To vary the depth of cutting, the carriage C' is adjustable; this adjustment consisting of a screw 63 rotatably supported by a standard 64 upon the bed C of the machine frame; the screw threaded shank of the screw 63 engaging in a screw threaded opening of a lug 64$^a$ which is positioned upon the carriage C'. Of course the line of adjustment is parallel to the sliding guided movement of the carriage C' upon the bed C, as determined by the grooves 27 and ribs 28.

The means L is adjustable to receive boards of various thicknesses, and it supports the board or piece 50 to be grooved at an acute angle to the vertical, in order that it may be moved relative to the cutting head K for grooving the previously bevel cut surface.

A substantially U-shaped guide frame 75 is secured at its upper and lower ends in the offset recesses of the upper and lower braces 18 and 70 of the frame B, and bolted therein as at 77. As shown in Figure 1 of the drawings, this guide piece 75 has side flanges 78 at the opposite marginal edges thereof, extending rearwardly, and providing substantially V-shaped grooves adapted to slidably receive the vertically adjustable frame 79 of the means L in a dove-tailed connection. The frame 79, as shown in the drawings, includes side plates 80, forwardly connected by a cross wall 81, shown in Figure 3, which cross wall is not very high. An inclined wall 83 is rigidly secured, either integral or otherwise attached to the walls 80, and being arranged at an acute angle to a vertical plane, and diverging downwardly with respect to the wall 81, to provide a substantially V-shaped pocket 85 within which the work 50 is received.

The stationary wall 75 is provided with an opening 90 through which the blades of the rotary cutting head K operate, and the wall 81 terminates above this opening, so that the blades will not hit it, and so that the blades will operate on the bevel end of the work 50 as the latter is elevated by the sliding frame 79.

If relatively thick pieces of work or lumber are being operated upon, the lumber may be slid into place against the inclined platform 83 directly upon the inside surface thereof facing the pocket 85. However, for lumber of thin cross section, detachable filler plates 88 may be employed, detachably connected in place in the pocket 85 against the inner surface of the wall 83, by bolts 89, and upon the inside surfaces of which the work 50 rests, as shown in Figure 3.

Means, forming part of the apparatus L is provided to hold the lumber 50 in place. It consists of a V-shaped wedge 90, of a nature to wedge against the wall 80 between the same and the work 50, to hold it in place so that it cannot lift eccentrically as the cutter blades operate thereon. The V-shaped wedge 90 has a front face which is vertically positioned against the wall 81 and out of the path of the blades of the rotary cutting head K.

The wedge 90 is eccentrically connected at 92 upon a crank portion of a shaft 93. This shaft 93 is supported at the upper ends of the wall 79, as shown in Figures 2 and 3, of the drawings, and it is provided with an operating lever 94 by which it may be turned to elevate and lower the wedge 90; the connecting rod 96 connecting the crank 92 with the recessed upper end of the wedge 90, as shown in Figure 3.

The operation of the machine to cut the plane bevel on the board or work 50 has been above described, and will be apparent from the description and drawings. To cut the grooves and ribs in the bevel surface of the work 50 it is necessary to place the board in the pocket 85 upon the sliding frame 79, in the manner above described, with the beveled surface 97 thereof resting against the inside surface of the wall 75, below the opening 90. This, of course, projects the lower ends of the board 50 into the cutting plane of the rotary cutter K. The wedge 90 is then lowered into clamping engagement between the wall 81 and the wedge 50, as shown in Figure 3, by the lever 94, in a manner which is apparent, and it is to be noted that the wedge 90 clears the cutting blades of the cutter K.

The frame 79 is then slid upwardly in a vertical plane, until the blades of the cutter K operate on the lower bevel end of the board 50. This movement is accomplished by means of a foot treadle 100 which is pivoted at 101 on the lower front end of the frame B. A wheel 102 is rotatably supported on a shaft 103, on a fixed axis on the frame B; the wheel 102 having connected on the periphery thereof at 104 a flexible band 105; the opposite end of which is connected at 107 upon the treadle 100 between the ends thereof. The band 105 extends about only part of the circumference of the wheel 102, and it is apparent that the shaft 103 will be rotated as the foot lever is depressed. This rotation will be in the direction shown by the arrow in Figure 3 of the drawings. The frame 79 is pivotally connected at 109 to a connecting rod 110; the connecting rod 110 being connected at 111 with the outer end of a lever 112 which is keyed upon a square portion of the shaft 103, as shown in Figure 3. The pressure of the treadle 100 of course slides the frame 79 upwardly until the bevel end of the board 50 rides against the cutter K and the grooves are cut as shown in Figure 6, into the bevel end of the board or work 50.

In addition to splicing together short lengths of board to provide lumber of the proper useful size, the invention may be used for cutting out knotty sections of lumber, and the ends of the lumber may then be spliced together in the manner above described. The joint is a sort of tongue and groove joint, and the faces may be so accurately cut by the machine A that the splice or joint will be practically concealed and invisible in the finished lumber. The glue may provide a bond between the bevel grooved surfaces, and of course other means of connection may be provided if desired.

Various changes in the shape, size, arrangement of parts, and alteration in the steps of forming the joint may be made to the invention as above described, and as herein claimed, without departing from the spirit of the invention or the scope of the claims.

I claim:

1. In a wood cutting machine of the class described a frame, a sliding carriage on said frame, a motor on said sliding carriage for movement therewith, a driven shaft for the motor, a second carriage slidable on the frame in substantial parallelism with the line of movement of the first mentioned carriage, a cutting blade on said driven shaft, means for supporting lumber on the second carriage for bevel cutting by the said blade, a cutter head on said shaft, and means for supporting the lumber after it has been cut in a beveled relation so that the bevel surface thereof may be further cut by said cutter head.

2. In a cutting machine of the class described a frame, a rotary cutter on the frame, a carrier movable in a linear direction on the frame tangential to the cutter, said carrier having a pocket therein, wedge means in the pocket for holding a length of lumber in a cutting relation with the cutter, a lever, and means connecting said lever with the carrier for movement of the latter so that the work will move into cutting engagement with the cutter upon operation of said lever.

3. In a cutting machine of the class described a frame, an upstanding wall on the frame having an opening therein, a rotary cutter carried by the frame and operating thru said opening so that the cutting portion of the cutter extends beyond the opposite surface of the wall thru the opening of the same, a work carrier slidable on the opposite side of the wall from the cutter in a line parallel with the plane of the wall, and means for holding work in the carrier in an acute angled relation to the line of movement of the carrier and into a cutting relation with the cutter.

4. In a cutting machine of the class described a frame, a rotary groove cutter rotatable on the frame, an upright wall carried by the frame, said wall having an opening thru which the groove cutter extends in a cutting projecting relation at the opposite side of said wall from the cutter, means for moving the cutter bodily to various extended degrees within said opening, a slidable carrier upon said wall, and means on the carrier for supporting work so that it may move into groove cutting relation with said cutter.

5. In a cutter of the class described a frame, a vertical wall having an opening therein, a rotary cutter at one side of the wall extending in cutting relation thru said opening to the opposite side of the wall, a carrier slidable on the wall at the opposite side from the cutter, said carrier having a V-shaped pocket therein for supporting a piece of work at an angle to the line of movement of the carrier, and wedge means for clamping the work in such position within said pocket.

6. In a cutter of the class described a frame, a vertical wall having an opening therein, a cutter at one side of the wall extending in cutting relation thru said opening to the opposite side of the wall, a carrier slidable on the wall at the opposite side from the cutter, said carrier having a V-shaped pocket therein for supporting a piece of work at an angle to the line of movement of the carrier, wedge means for clamping the work in such position within said pocket, said wedge means comprising a wedge body, a shaft rotatable on the carrier, and a connecting link eccentrically connected on said shaft and connected to said wedge body for movement of the latter upon rotation of the shaft.

7. In a cutting machine of the class described a frame, a rotary cutter on the frame, a work supporting carriage movable on the frame in cooperative cutting relation with the cutter, a lever pivoted on the frame, a shaft rotatable on the frame, a wheel keyed on the shaft, a flexible band connected with the lever intermediate its ends and with the wheel and extending partially about the wheel to connection thereon at a point remote from the connection with the lever whereby upon movement of the lever the wheel and its shaft may be rotated thru an arc, and means connecting said shaft and the carrier for movement of the latter upon movement of said lever.

8. In a cutting machine of the class described a frame, a rotary groove cutter, a carriage slidably supporting the rotary groove cutter, an upstanding wall carried by the frame having an opening therein, means for adjusting the carriage so that the cutter operates through said opening at the opposite side thereof from said cutter axis, a carriage on the upstanding wall, means to move the latter carriage, and means on the latter carriage for clamping a piece of work therein at the opposite side of the upstanding wall from said cutter axis and in such relation that an end thereof may be moved into cutting relation with the cutter across said opening.

JESSE A. BEERWORTH.